United States Patent
Ali

(10) Patent No.: US 7,409,585 B2
(45) Date of Patent: Aug. 5, 2008

(54) AUTOMATIC MEDIA REPAIR AFTER READ FAILURE DUE TO MEDIA ERROR

(75) Inventor: Ahmad A. J. Ali, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 408 days.

(21) Appl. No.: 10/769,496

(22) Filed: Jan. 30, 2004

(65) Prior Publication Data

US 2005/0188280 A1 Aug. 25, 2005

(51) Int. Cl.
*G06F 11/00* (2006.01)
(52) U.S. Cl. .......................... 714/8; 714/764
(58) Field of Classification Search ............. 714/8, 714/764
See application file for complete search history.

(56) References Cited

U.S. PATENT DOCUMENTS

| | | | | |
|---|---|---|---|---|
| 4,479,214 A * | 10/1984 | Ryan | ........................ | 714/702 |
| 5,099,485 A | 3/1992 | Bruckert et al. | ........... | 371/68.3 |
| 5,278,982 A | 1/1994 | Daniels et al. | ............. | 395/600 |
| 5,381,527 A | 1/1995 | Inniss et al. | ................. | 395/200 |
| 5,596,390 A * | 1/1997 | Sawada | ......................... | 399/8 |
| 5,764,877 A | 6/1998 | Lomet et al. | ........... | 395/182.04 |
| 6,044,444 A | 3/2000 | Ofek | ......................... | 711/162 |
| 6,237,052 B1 | 5/2001 | Stolowitz | ..................... | 710/61 |
| 6,327,106 B1 | 12/2001 | Rothberg | ..................... | 360/53 |
| 6,496,313 B1 * | 12/2002 | Haines et al. | ................. | 360/53 |
| 6,640,317 B1 | 10/2003 | Snow | ......................... | 714/38 |
| 6,650,492 B2 * | 11/2003 | Lenny et al. | ................. | 360/31 |
| 6,944,791 B2 * | 9/2005 | Humlicek et al. | ............. | 714/6 |
| 6,993,679 B2 * | 1/2006 | George | ......................... | 714/8 |
| 7,102,780 B2 * | 9/2006 | Watanabe | .................... | 358/1.15 |
| 2001/0042230 A1 * | 11/2001 | Williams et al. | ........... | 714/703 |
| 2003/0233611 A1 * | 12/2003 | Humlicek et al. | ........... | 714/763 |

* cited by examiner

*Primary Examiner*—Scott T Baderman
*Assistant Examiner*—Paul F Contino
(74) *Attorney, Agent, or Firm*—Baker Botts L.L.P.

(57) ABSTRACT

A system and method are provided for a storage device that performs automatic media repair so that, after a media error is encountered, subsequent write operations are completed on a known good sector while read operations from the repaired sector are induced to fail so that the user never receives corrupted or indeterminate data. Recovery of the error is accomplished by restoring the damaged file, without resorting to the restoration of the complete media volume. Consequently, recovery from media error is accomplished in less time, and affects only the working processes that use the affected file, rather than the system as a whole.

27 Claims, 3 Drawing Sheets

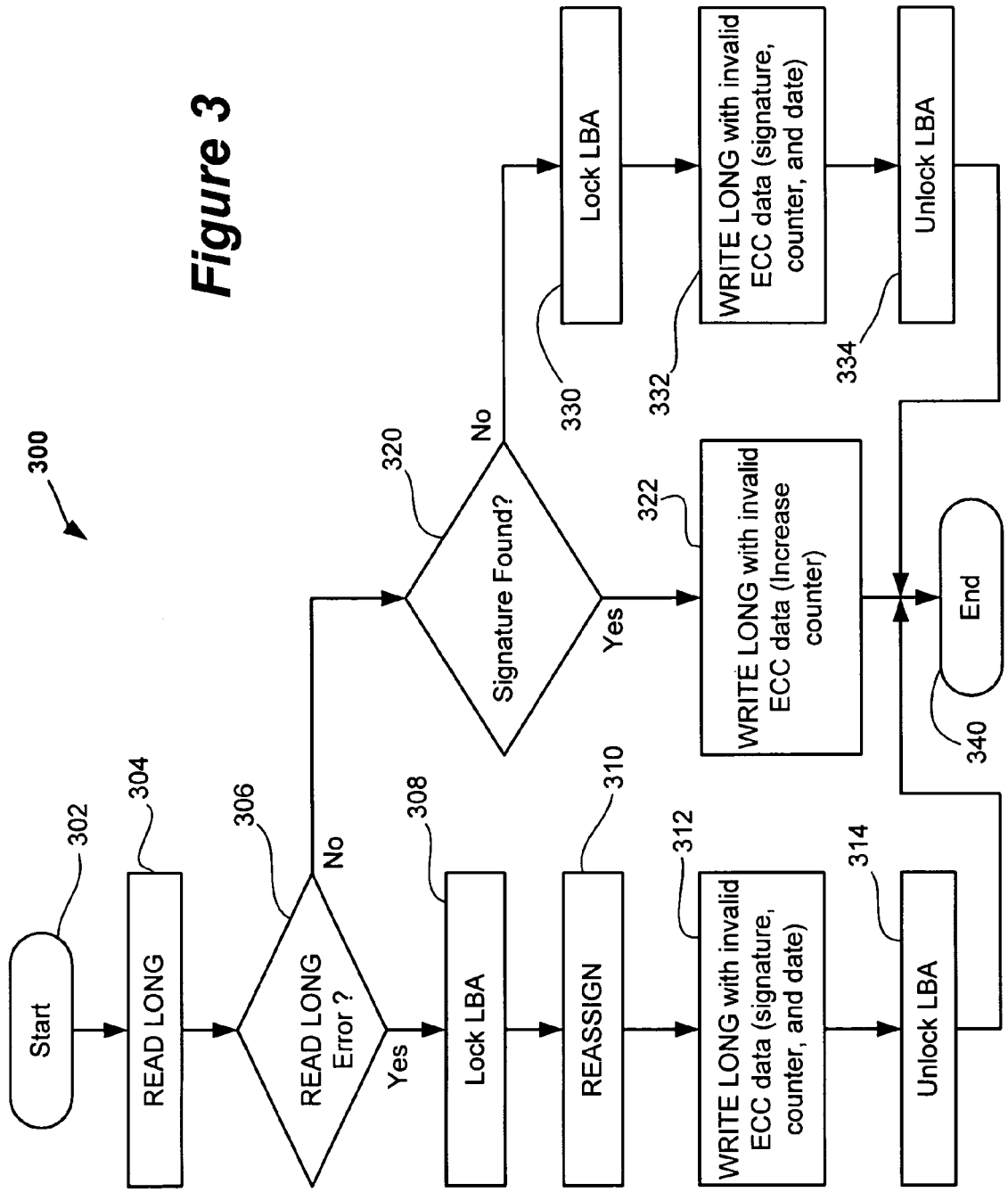

AUTOMATIC MEDIA REPAIR AFTER READ FAILURE DUE TO MEDIA ERROR

BACKGROUND

1. Field of the Disclosure

The present disclosure relates in general to the field of data storage systems and, more particularly, to a system and method for repairing, in an automated fashion, the media of the storage system after an error is encountered in the media.

2. Background of the Related Art

As the value and the use of information continue to increase, individuals and businesses seek additional ways to process and store information. One option available to users is information handling systems. An information handling system generally processes, compiles, stores and/or communicates information or data for business, personal or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, redundant array of independent disks ("RAID") system and telecommunications switch.

Computer systems often include hard media, such as IDE and/or SCSI devices. Hard media errors during read operations on SCSI drives under RAID controllers are gracefully handled for redundant RAID configurations (such as in RAID levels 1, 5, or 10) but not on non-redundant configurations (such as RAID level 0, or degraded levels 1, 5, or 10) where there is no recovery mechanism. The host level software application may experience a read failure when a media error is encountered because the data associated with software application is stored at the location of the media error and is thus inaccessible and/or corrupted.

One problem scenario is when a user attempts to restore data from a backup. Part of the restored data may again be written to the same (bad) sector that caused the read error originally. SCSI drives do not track sectors that have caused read errors previously, and new write commands to the bad sector may be completed without any verification and thus reported as being completed successfully. Subsequent read commands from that bad sector may result in an unrecoverable error due to lack of data availability or corruption.

A second problem scenario is when a user performs a "verify" operation on the SCSI disk. In that case, the verify operation would detect the bad sector on the disk and reassign a good sector (from the spare sectors) in place of the bad sector. The problem with this operation is that unknown "data" (in the form of "1's and 0's") exists on the newly assigned good sector. The software application that was using the data on the bad sector is unaware of the reassignment by the verify operation, and hence does not know that a block of data (from the bad sector) is now of unknown status or validity. Indeed, the software application could issue a read request for the data in the reassigned sector and inadvertently read the unknown data that was present in the new sector when it was reassigned during the verify operation. The software application would then be working on unknown, and potentially corrupted data, which may result in a crash of the software application, or produce inaccurate results. A user may restore the damaged file after the repair, but the verify operation may have reassigned/repaired other bad sectors that were discovered during the verify operation and the files residing on those sectors would (presumably) be corrupted. Moreover, the files in question may have already been corrupted (due to a bad sector) but went unnoticed because those sectors had not undergone a read operation.

In the past, recovery from media errors on SCSI drives required a complete restore operation from backup (assuming that a backup existed). A complete recovery was warranted because it was hard to determine which files were corrupted and/or damaged due to bad sectors that were uncovered during the verify operation. There is, therefor, a need in the art for a system and/or method for avoiding bad sectors on a storage media while maintaining operation of that media.

SUMMARY OF THE INVENTION

In accordance with the present disclosure, a system and method are provided that performs automatic media repair so that, after a media error is encountered, subsequent write operations are completed on a known good sector while read operations to the repaired sector are induced to fail so that the user never receives corrupted or undetermined data. Another advantage of the present disclosure is that recovery of lost data due to the media error is achievable by restoring only the damaged file, rather than restoring the complete media volume. Consequently, recovery is quicker and only affects one of the working processes, rather than the system as a whole.

This disclosure provides a method for media repair of a storage device, wherein the storage device performs a read operation on the storage device, detects a read error, locks a logical block address on the storage device, performing a reassign operation on the storage device, performs a write (signature and date) operation on the storage device, and unlocks the logical block address after the write operation. Alternatively, if an error is not detected from the read operation, the method may perform detect a signature (such as an ECC signature), and perform a write operation on the storage device. If no signature is found, the method can lock a logical block address on the storage device and perform a write operation on the storage device to place the signature, and unlock the logical block address. The storage device can be in a non-RAID or non-redundant RAID configuration. Moreover, to facilitate the method disclosed herein, the read operation is a READ LONG operation, the write operation is a WRITE LONG operation which may produce invalid ECC data. The storage device in question can be a SCSI device, and IDE device, an ATA device, or similar.

Other technical advantages should be apparent to one of ordinary skill in the art in view of the specification, claims, and drawings.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein:

FIG. 3 is a flowchart of an embodiment of the present disclosure.

Figure 1:
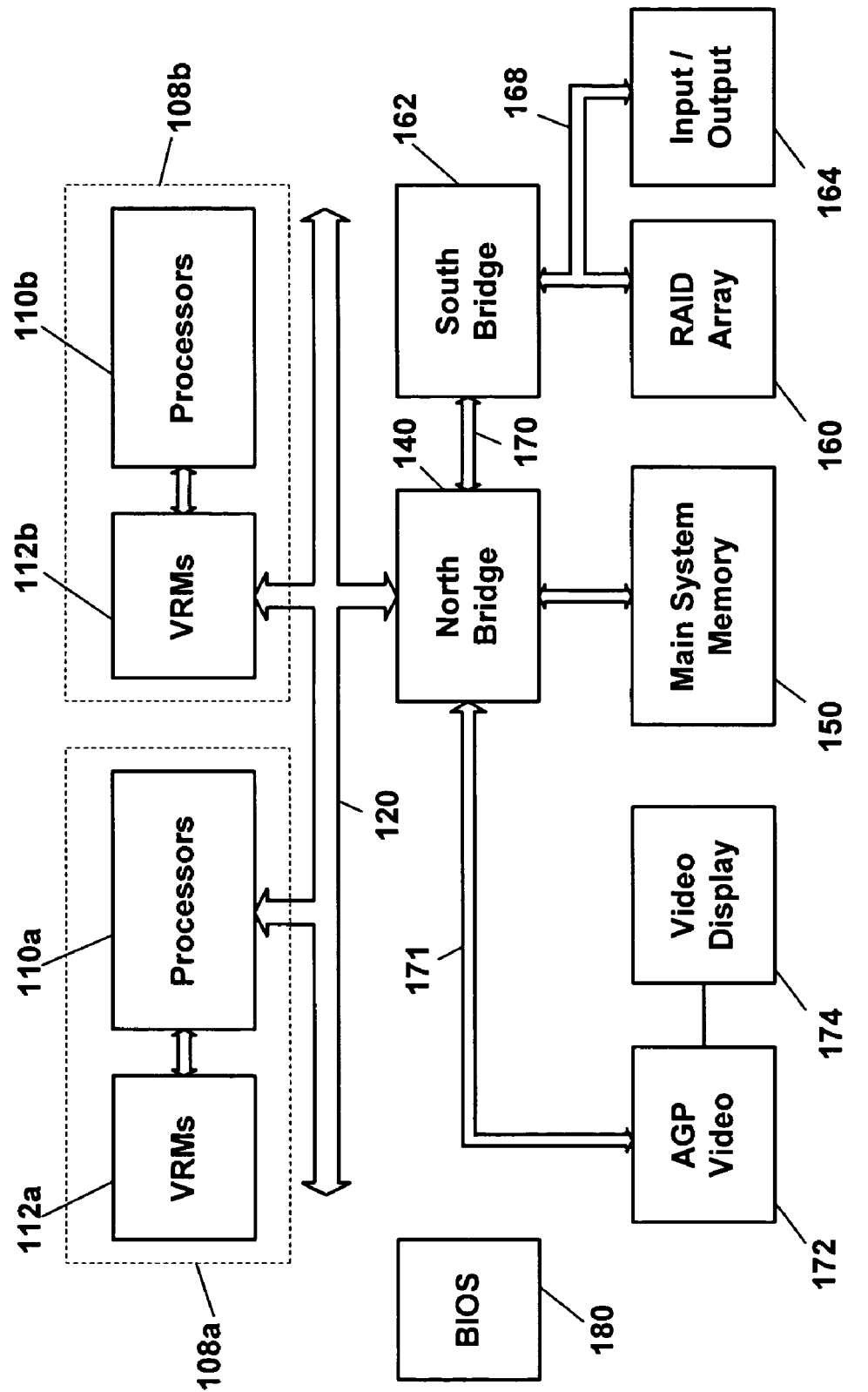
FIG. 1 depicts a component diagram of a storage area network including one embodiment of a resource management engine that incorporates the teachings of the present disclosure.

The present disclosure may be susceptible to various modifications and alternative forms. Specific exemplary embodiments thereof are shown by way of example in the drawing and are described herein in detail. It should be understood, however, that the description set forth herein of specific embodiments is not intended to limit the present disclosure to the particular forms disclosed. Rather, all modifications, alternatives, and equivalents falling within the spirit and scope of the invention as defined by the appended claims are intended to be covered.

DETAILED DESCRIPTION OF THE PREFERRED EMBODIMENTS

The present disclosure provides a system and method for a RAID controller or a non-RAID controller that performs automatic media repair so that, after a media error is encountered, subsequent write operations are completed on a known good sector while read operations to the repaired sector are induced to fail so that the user never receives corrupted or undetermined data. Another advantage of the present disclosure is that recovery of the error is only by restoring the damaged file, rather than restoring the complete media volume. Consequently, recovery is quicker and only affects one of the working processes, rather than the system as a whole. The method disclosed herein is particularly useful for non-RAID and non-redundant RAID configurations.

In one embodiment, a method is employed that uses SCSI REASSIGN, WRITE LONG, and READ LONG commands. The REASSIGN command allows the disk to remap the bad sector into a reserved sector. The WRITE LONG command allows the manipulation of error checking and correction ("ECC") data for the reassigned sector so that the data associated with the bad sector appears to be corrupted to a READ command, but would still allow a WRITE command to complete with proper ECC data for that bad sector.

In another embodiment, the controller is able to differentiate between repaired sectors (having one or more soft read errors) and unrepaired bad sectors (those with one or more hard error) by using READ LONG commands based on a signature that is written on the repaired sectors using the WRITE LONG command.

In another embodiment, a counter and date can be stored along with the signature on each repaired sector in order to avoid multiple event logging and/or user notification for a single sector. Moreover, the technique can be used to track the age of the repaired (but not corrected) sector.

While the embodiments above utilized commands according to the SCSI standard, other disk drives, such as integrated drive electronics ("IDE") devices and/or advanced technology attachment ("ATA") devices and/or regular IDE drives may benefit from the method disclosed herein. In order to work according to the method disclosed herein, however, the alternate drive type would have to support something like the WRITE LONG command, although the device in question need not support the exact same WRITE LONG as the SCSI specification. For example, something like the SoftCorruptBlock command could be used in order to implement the method disclosed herein.

Elements of the present disclosure can be implemented on a computer system, as illustrated in FIG. 1. Referring to FIG. 1, depicted is an information handling system, generally referenced by the numeral 100, having electronic components mounted on at least one printed circuit board ("PCB") (not shown) and communicating data and control signals therebetween over signal buses. In one embodiment, the information handling system is a computer system. The information handling system comprises processors 110 and associated voltage regulator modules ("VRMs") 112 configured as processor nodes 108. There may be one or more processor nodes 108, one or more processors 110, and one or more VRMs 112, illustrated in FIG. 1 as nodes 108a and 108b, processors 110a and 110b and VRMs 112a and 112b, respectively. A north bridge 140, which may also be referred to as a "memory controller hub" or a "memory controller," is coupled to a main system memory 150. The north bridge 140 is coupled to the processors 110 via the host bus 120. The north bridge 140 is generally considered an application specific chip set that provides connectivity to various buses, and integrates other system functions such as memory interface. For example, an INTEL® 820E and/or INTEL® 815E chip set, available from the Intel Corporation of Santa Clara, Calif., provides at least a portion of the north bridge 140. The chip set may also be packaged as an application specific integrated circuit ("ASIC"). The north bridge 140 typically includes functionality to couple the main system memory 150 to other devices within the information handling system 100. Thus, memory controller functions, such as main memory control functions, typically reside in the north bridge 140. In addition, the north bridge 140 provides bus control to handle transfers between the host bus 120 and a second bus(es), e.g., PCI bus 170 and AGP bus 171, the AGP bus 171 being coupled to the AGP video 172 and/or the video display 174. The second bus may also comprise other industry standard buses or proprietary buses, e.g., ISA, SCSI, USB buses 168 through a south bridge (bus interface) 162. These secondary buses 168 may have their own interfaces and controllers, e.g., RAID Array storage system 160 and input/output interface(s) 164. Finally, a BIOS 180 is operative with the information handling system 100 as illustrated in FIG. 1. The information handling system 100 can be combined with other like systems to form larger systems. Moreover, the information handling system 100, can be combined with other elements, such as networking elements, to form even larger and more complex information handling systems.

Figure 2:
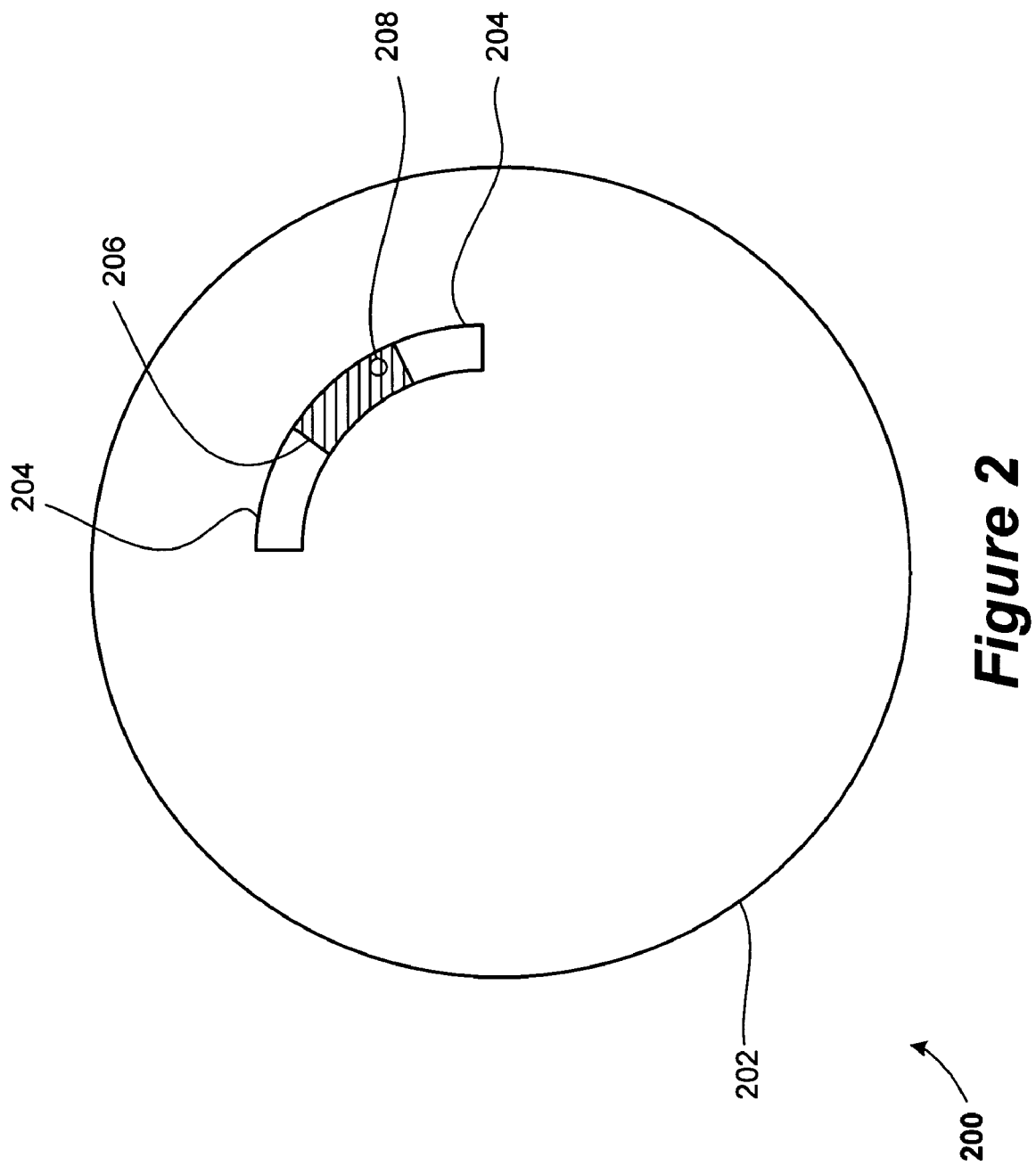
FIG. 2 is a block diagram illustrating a mass storage device having a sector and a bad section of that sector.

FIG. 2 illustrates a mass storage device 200, such as a SCSI device, having a storage disk 202 that has at least one sector 204. The storage device 200 can be a standalone device, or be part of the RAID array 160 (see FIG. 1). In this illustration, a file 206 is stored within the sector 206. A bad portion 208 of the sector 204 can arise from any number of factors as is commonly experienced in the art. As the bad portion 208 arose within the space allocated for the file 206, one or more bytes of the file 206 may be corrupted or indeterminate. Hence, some error correction mechanism is needed to ensure integrity of the file, preferably without removing the disk 202 from operation.

FIG. 3 illustrates the method of the present disclosure. The media READ error recovery method begins generally at step 302. First, in step 304, a READ LONG command is issued to the disk 200. A check is then made in step 306 to determine if an error was encountered by performing step 302. If an error was encountered (i.e., the result of step 306 is positive) then the logical block address ("LBA") for the device 200 is locked. Thereafter, in step 310, a REASSIGN command is issued to the device 200. Then, in step 312, a WRITE LONG command is issued with invalid ECC data, preferably with a signature, counter, and date information. Once the WRITE LONG operation has been completed, the logical block address can be unlocked in step 314, and the method ends generally at step 340.

An alternate scenario occurs when a READ LONG operation does not produce an error (i.e., the result of step 306 is negative). In that case, a check is made in step 320 to determine if a signature is found as a result of the READ LONG command. If a signature was found (i.e., the result of step 320 is positive), then a WRITE LONG command is executed with invalid ECC data, and a counter is increased, after which the method ends generally at step 340.

Another alternate scenario occurs when a signature was not found (i.e., the result of step 320 is negative). In that case, the LBA is locked in step 330. Next, in step 332, the WRITE LONG command is executed with invalid ECC data (including signature, counter, and date information). Once the WRITE LONG command has been completed, the LBA is unlocked in step 334 and the method ends generally at step 340.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for media repair of a storage device, comprising:
    performing a read operation on the storage device;
    detecting a read error;
    locking a logical block address on the storage device if the read error is detected;
    performing a reassign operation on the storage device after the logical block address is locked;
    performing a write operation on the storage device after locking the logical block address, wherein the write operation is performed with counter and date information; and
    unlocking the logical block address after performing the write operation.

2. The method of claim 1, wherein the storage device is a non-redundant RAID configuration.

3. The method of claim 1, wherein the read operation is a READ LONG operation.

4. The method of claim 1, wherein the write operation is a WRITE LONG operation.

5. The method of claim 4, wherein the WRITE LONG operation produces invalid ECC data.

6. The method of claim 1, wherein the storage device is a SCSI device.

7. The method of claim 1, wherein the storage device is an IDE device.

8. The method of claim 1, wherein the storage device is an ATA device.

9. The method of claim 1, wherein the storage device is a non-RAID configuration.

10. A method for media repair of a storage device, comprising:
    performing a read operation on the storage device;
    locking a logical block address on the storage device if a read error is detected;
    performing a write operation on the storage device after locking the logical block address, wherein the write operation is performed with counter and date information; and
    unlocking the logical block address after performing the write operation.

11. The method of claim 10, wherein the storage device is a non-redundant RAID configuration.

12. The method of claim 10, wherein the read operation is a READ LONG operation.

13. The method of claim 10, wherein the write operation is a WRITE LONG operation.

14. The method of claim 11, wherein the WRITE LONG operation produces invalid ECC data.

15. The method of claim 10, wherein the storage device is a SCSI device.

16. The method of claim 10, wherein the storage device is an IDE device.

17. The method of claim 10, wherein the storage device is an ATA device.

18. The method of claim 10, wherein the storage device is a non-RAID configuration.

19. A computer system comprising:
    a storage device having storage media, the storage device operable to perform a read operation;
    the storage device further operable to detect a read error, after performing the read operation;
    the storage device further operable to lock a logical block address on the storage device if the read error is detected;
    the storage device further operable to perform a reassign operation on the storage device;
    the storage device further operable to perform a write operation on the storage device, wherein the write operation is performed with counter and date information; and
    the storage device further operable to unlock the logical block address after performing the write operation;
    wherein the storage device is operable to detect errors in the storage media during the read operation and write invalid ECC data to prompt replacement of a portion of the storage media being read.

20. The system of claim 19, wherein the storage device is a non-redundant RAID configuration.

21. The system of claim 19, wherein the read operation is a READ LONG operation.

22. The system of claim 19, wherein the write operation is a WRITE LONG operation.

23. The system of claim 19, wherein the WRITE LONG operation produces invalid ECC data.

24. The system of claim 19, wherein the storage device is a SCSI device.

25. The system of claim 19, wherein the storage device is an IDE device.

26. The system of claim 19, wherein the storage device is an ATA device.

27. The system of claim 19, wherein the storage device is a non-RAID configuration.

* * * * *